(12) United States Patent
Otsuki

(10) Patent No.: US 12,291,208 B2
(45) Date of Patent: May 6, 2025

(54) VEHICLE SPEED LIMITING DEVICE, VEHICLE SPEED LIMITING METHOD, AND VEHICLE SPEED LIMITING PROGRAM

(71) Applicant: TOYOTA JIDOSHA KABUSHIKI KAISHA, Toyota (JP)

(72) Inventor: Masaru Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 18/168,746

(22) Filed: Feb. 14, 2023

(65) Prior Publication Data
US 2023/0294698 A1   Sep. 21, 2023

(30) Foreign Application Priority Data
Mar. 17, 2022  (JP) ................................ 2022-042343

(51) Int. Cl.
*B60W 50/12* (2012.01)
*B60W 30/18* (2012.01)
*B60W 50/10* (2012.01)

(52) U.S. Cl.
CPC ...... *B60W 30/18009* (2013.01); *B60W 50/10* (2013.01); *B60W 50/12* (2013.01); *B60W 2520/10* (2013.01)

(58) Field of Classification Search
CPC ......... B60W 30/18009; B60W 30/142; B60W 30/146; B60W 2540/10
USPC .......................................................... 701/70
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2* | 2/2013 | Inoue | B60W 10/184 |
| | | | 701/84 |
| 8,417,430 B2 | 4/2013 | Saeki | |
| 8,548,709 B2 | 10/2013 | Morita | |
| 8,768,597 B2 | 7/2014 | Kagawa | |
| 9,162,677 B2* | 10/2015 | Sekine | B60W 30/143 |
| 9,174,643 B2 | 11/2015 | Aso | |
| 10,017,178 B2 | 7/2018 | Morimoto et al. | |
| 10,118,617 B2 | 11/2018 | Urano et al. | |

(Continued)

FOREIGN PATENT DOCUMENTS

| | | |
|---|---|---|
| JP | 2009-166512 A | 7/2009 |
| JP | 2009-166542 A | 7/2009 |

*Primary Examiner* — Logan M Kraft
*Assistant Examiner* — Joshua Campbell
(74) *Attorney, Agent, or Firm* — Sughrue Mion, PLLC

(57) ABSTRACT

A vehicle speed limiting device includes a control device with first and second speed limiting functions, and a first cancel function for disabling the first speed limiting function when a first condition is satisfied and the vehicle speed matches a first speed. The control device has a first cancel function canceling the second speed limiting function when an elapsed time from a first time at which the first speed limiting function is disabled by the first cancel function to a second time when the vehicle speed reaches a second speed lower than a predetermined threshold and the first condition is satisfied at the second time; or a second cancel function for disabling the second speed limiting function when a difference between the first and second speeds is smaller than a predetermined threshold and the first condition is satisfied at the second time after the first speed limiting function is disabled.

6 Claims, 5 Drawing Sheets

(56) References Cited

U.S. PATENT DOCUMENTS

| | | |
|---|---|---|
| 10,486,698 B2 | 11/2019 | Masui et al. |
| 2019/0295419 A1 | 9/2019 | Tosa et al. |
| 2021/0354694 A1* | 11/2021 | Hirakuri ............. B60W 30/045 |

* cited by examiner

VEHICLE SPEED LIMITING DEVICE, VEHICLE SPEED LIMITING METHOD, AND VEHICLE SPEED LIMITING PROGRAM

BACKGROUND OF THE INVENTION

1. Field of the Invention

The present invention relates to a vehicle speed limiting device, a vehicle speed limiting method, and a vehicle speed limiting program, and the vehicle speed limiting device is mounted to an own vehicle, and controls a drive device and/or a braking device of the vehicle such that a speed of the own vehicle does not exceed a threshold value.

2. Description of the Related Art

There has been known a vehicle speed limiting device which is mounted to an own vehicle, and controls a drive device and/or a braking device of the own vehicle such that a speed of the own vehicle does not exceed a threshold value (see, for example, Japanese Patent Application Laid-open No. 2009-166542). The vehicle speed limiting device as described in Japanese Patent Application Laid-open No. 2009-166542 (hereinafter referred to as "related-art device") has a first vehicle speed limiting function of controlling the drive device and/or the braking device of the own vehicle such that the speed of the own vehicle does not exceed a first speed (such that the own vehicle travels at a constant speed being a target vehicle speed). Moreover, the related-art device has a second vehicle speed limiting function of controlling the drive device and/or the braking device of the own vehicle such that the speed of the own vehicle does not exceed a second speed (>first speed) (does not exceed an upper limit speed).

It is preferred for the vehicle speed limiting device having the first vehicle speed limiting function and the second vehicle speed limiting function as in the related-art device to have a first cancel function of disabling the first vehicle speed limiting function when a first condition is satisfied and a second cancel function of disabling the second vehicle speed limiting function when a second condition is satisfied. In this case, when a driver executes an operation (driving) such that the first condition is satisfied, the driver can accelerate the own vehicle so that the vehicle speed exceeds the first speed. Moreover, when the driver executes the operation (driving) such that the second condition is satisfied, the driver can accelerate the own vehicle so that the vehicle speed exceeds the second speed. In a usual situation, no problem occurs as long as each of the first vehicle speed limiting function and the second vehicle speed limiting function can be disabled independently when a corresponding one of the first condition and the second condition is satisfied as described above. Meanwhile, in a special situation (for example, a situation in which an obstacle is to be avoided), it is preferred that the first vehicle speed limiting function and the second vehicle speed limiting function be able to be quickly disabled. In this situation, it is troublesome for the driver to satisfy each of the different conditions in order to disable a corresponding one of the vehicle speed limiting functions, and moreover, there may occur a case in which a purpose in the special situation (for example, the avoidance of the obstacle) cannot be achieved. Thus, in the special situation, it is preferred that the second vehicle speed limiting function be able to be disabled more easily than in the usual situation after the first vehicle speed limiting function is disabled.

SUMMARY OF THE INVENTION

One object of the present invention is to provide a vehicle speed limiting device which has a first vehicle speed limiting function and a second vehicle speed limiting function, and is capable of disabling the second vehicle speed limiting function more easily than in a usual situation after the first vehicle speed limiting function is disabled in a special situation.

In order to solve the above-mentioned problem, a vehicle speed limiting device (1) according to at least one embodiment of the present invention is mounted to an own vehicle.

According to at least one embodiment of the present invention, there is provided a vehicle speed limiting device including: an operation unit sensor (22) configured to detect an operation mode of an operation unit to be operated when a driver accelerates an own vehicle; a speed sensor (21) configured to detect a speed (vs) of the own vehicle; and a control device having a first vehicle speed limiting function of controlling any one or both of a drive device (30) and a braking device (40) of the own vehicle such that the speed does not exceed a first speed (vs1), a first cancel function of disabling the first vehicle speed limiting function when a first operation unit condition (A1) relating to an operation on the operation unit is satisfied in a situation in which the speed of the own vehicle matches the first speed, a second vehicle speed limiting function of controlling any one or both of the drive device and the braking device of the own vehicle such that the speed of the own vehicle does not exceed a second speed (vs2) higher than the first speed, and a second cancel function of disabling the second vehicle speed limiting function when a second operation unit condition (A2) relating to the operation on the operation unit is satisfied in a situation in which the speed of the own vehicle matches the second speed. The control device has at least one of: a first forcible cancel function of forcibly disabling the second vehicle speed limiting function when an elapsed time (t) from a first time point at which the first vehicle speed limiting function is disabled through use of the first cancel function to a second time point at which the speed of the own vehicle reaches the second speed is shorter than a predetermined threshold value (tth) and the first operation unit condition is satisfied at the second time point; or a second forcible cancel function of forcibly disabling the second vehicle speed limiting function when a difference between the first speed and the second speed is smaller than a predetermined threshold value (vsth) and the first operation unit condition is satisfied at the second time point after the first vehicle speed limiting function is disabled through use of the first cancel function.

The first operation unit condition is satisfied when, for example, a duration of a state in which a depression depth of an accelerator pedal is deeper than a first depth exceeds a first time. Moreover, the second operation unit condition is satisfied when, for example, a duration of a state in which the depression depth of the accelerator pedal is deeper than a second depth exceeds a second time. Further, the first operation unit condition is satisfied when, for example, an increase rate (%/sec) of the depression depth of the accelerator pedal exceeds a first increase rate. Still further, the second operation unit condition is satisfied when, for example, the increase rate (%/sec) of the depression depth of the accelerator pedal exceeds a second increase rate.

In the at least one embodiment of the present invention, in a situation in which the time from the first time point to the second time point is relatively short and the first operation unit condition is satisfied at the second time point, even when the second operation unit condition is not satisfied, the second vehicle speed limiting function is disabled through the first forcible cancel function. Moreover, in a situation in which the difference between the first speed and the second speed is relatively small, necessity for providing the two vehicle speed limiting functions (first vehicle speed limiting function and second vehicle speed limiting function) is low. Thus, in the at least one embodiment of the present invention, when the difference between the first speed and the second speed is smaller than the threshold value, the second vehicle speed limiting function is disabled through the second forcible cancel function under the same condition as the condition for disabling the first vehicle speed limiting function (that is, the first operation unit condition). As described above, according to the at least one embodiment of the present invention, in the special situation, the driver can disable the second vehicle speed limiting function more easily than in the usual situation.

In the vehicle speed limiting device according to at least one aspect of the present invention, the first forcible cancel function is a function of forcibly disabling the second vehicle speed limiting function when the elapsed time from the first time point to the second time point is shorter than the predetermined threshold value and the first operation unit condition is continuously satisfied from the first time point to the second time point.

In the vehicle speed limiting device according to another aspect of the present invention, the second forcible cancel function is a function of forcibly disabling the second vehicle speed limiting function when the difference between the first speed and the second speed is smaller than the predetermined threshold value and the first operation unit condition is continuously satisfied from the first time point to the second time point.

In those aspects, when the first operation unit condition is temporarily unsatisfied in the time from the first time point to the second time point, it is required that the second operation unit condition be satisfied in order to cause the own vehicle to travel at a speed higher than the second speed. As a result, it is possible to prevent the own vehicle from being excessively accelerated after the speed of the own vehicle exceeds the first speed.

Moreover, a vehicle speed limiting method and a vehicle speed limiting program according to at least one embodiment of the present invention include steps executed by each device forming the above-mentioned vehicle speed limiting device. According to the method and the program, in the special situation, the driver can disable the second vehicle speed limiting function more easily than in the usual situation.

DESCRIPTION OF THE EMBODIMENTS (Overview of Configuration)

Figure 1:
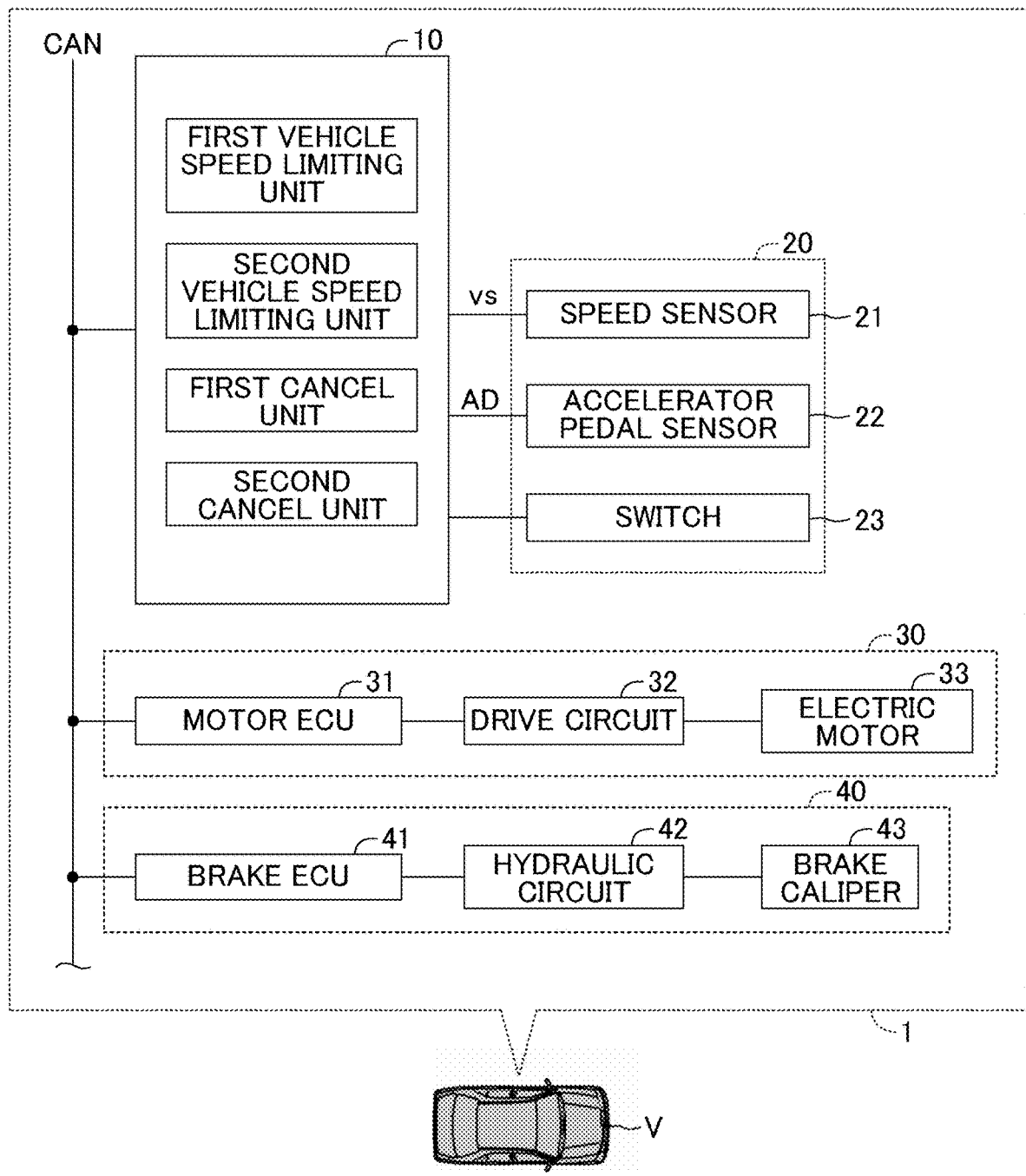
FIG. 1 is a block diagram of a vehicle speed limiting device according to at least one embodiment of the present invention.

As illustrated in FIG. 1, a vehicle speed limiting device 1 according to at least one embodiment of the present invention is mounted to a vehicle V. The vehicle speed limiting device 1 has two vehicle speed limiting functions and cancel functions for disabling the vehicle speed limiting functions as described in detail later. The vehicle to which the vehicle speed limiting device 1 is mounted is sometimes referred to as "own vehicle" so as to distinguish this vehicle from other vehicles.

(Specific Configuration)

As illustrated in FIG. 1, the vehicle speed limiting device 1 includes a vehicle speed limiting ECU 10, in-vehicle sensors 20, a drive device 30, and a braking device 40.

The vehicle speed limiting ECU 10 includes a microcomputer including, for example, a CPU, a ROM, a RAM, and a timer. As used herein, "ECU" means an electronic control unit, and the ECU includes a microcomputer including, for example, a CPU, a ROM, and a RAM. The CPU implements various functions by executing instructions stored in the ROM.

The vehicle speed limiting ECU 10 is connected to other ECUs (motor ECU 31 and brake ECU 41 described later) via a controller area network (CAN) in a manner that enables information to be transmitted and received to and from each other.

The in-vehicle sensors 20 include sensors which acquire information on a travel state of the vehicle V and an operation mode of an operating element (such as a speed of the own vehicle and an operation mode of an accelerator pedal).

Specifically, the in-vehicle sensors 20 include a speed sensor 21, an accelerator pedal sensor 22, and a switch 23.

The speed sensor 21 includes a wheel speed sensor which generates one pulse signal (wheel pulse signal) each time a wheel of the own vehicle rotates by a predetermined angle. The speed sensor 21 measures the number of pulses of the wheel pulse signal transmitted from the wheel speed sensor in unit time, calculates a rotation speed (wheel speed) of each wheel based on the measured number of pulses, and calculates a speed vs (actual vehicle speed) of the own vehicle based on the wheel speed of each wheel. The speed sensor 21 transmits data representing the speed vs to the vehicle speed limiting ECU 10.

The accelerator pedal sensor 22 detects a depression depth AD of the accelerator pedal (not shown) of the vehicle V. The accelerator pedal sensor 22 transmits data representing the depression depth AD of the accelerator pedal to the vehicle speed limiting ECU 10. The vehicle speed limiting ECU 10 sequentially acquires the depression depth AD, and stores the acquired depression depth AD in the RAM (ring buffer). The vehicle speed limiting ECU 10 can recognize a change in depression depth AD of the accelerator pedal based on the data stored in this ring buffer.

The switch 23 includes a push-button type switch, a rotary encoder, or the like for a driver to determine a limit value (upper limit value (hereinafter referred to as "first speed vs1")) of the speed of the own vehicle.

The drive device 30 generates a driving force, and applies the driving force to drive wheels out of wheels (left front wheel, right front wheel, left rear wheel, and right rear wheel). The drive device 30 includes, for example, the motor ECU 31, a drive circuit 32, an electric motor 33, and a driving force transmission mechanism (not shown) which transmits the driving force to the wheels. The motor ECU 31 is connected to the drive circuit 32. The drive circuit 32 includes an inverter circuit which inverts DC power supplied from a battery (not shown) to AC power, and supplies the AC power to the electric motor 33, to thereby drive the electric motor 33. The motor ECU 31 acquires the depression depth AD of the accelerator pedal from the vehicle speed limiting ECU 10. The vehicle speed limiting ECU 10 can appropriately correct the depression depth acquired from the accelerator pedal sensor 22, and transmit the corrected depression depth AD to the motor ECU 31. The motor ECU 31 transmits a torque control signal to the drive circuit 32 in accordance with the depression depth AD acquired from the vehicle speed limiting ECU 10. The drive circuit 32 adjusts power (such as cycle and duty ratio) to be supplied to the electric motor 33 in accordance with the torque control signal acquired from the motor ECU 21. In the manner described above, the torque to be generated by the electric motor 33 is controlled. The torque generated by the electric motor 33 is transmitted to the drive wheels via the driving force transmission mechanism (for example, drive shafts).

The braking device 40 applies a braking force to the wheels. The braking device 40 includes the brake ECU 41, a hydraulic circuit 42, and a brake caliper 43. The hydraulic circuit 42 includes, for example, a reservoir, an oil pump, various valve devices, and a hydraulic sensor (which are not shown). The brake caliper 43 is a hydraulic actuator including a cylinder and a piston. When oil is supplied to the cylinder, the piston is pushed out of the cylinder. A brake pad is arranged at the tip of the piston, and the brake pad is pressed against a brake disc. The brake ECU 41 acquires the depression depth BD of the brake pedal from the vehicle speed limiting ECU 10. The vehicle speed limiting ECU 10 can appropriately correct the depression depth BD of the brake pedal acquired from the brake pedal sensor, and transmit the corrected depression depth BD to the brake ECU 41. The brake ECU 41 transmits a hydraulic pressure control signal to the hydraulic circuit 42 in accordance with the depression depth BD acquired from the vehicle speed limiting ECU 10. The hydraulic circuit 42 adjusts the hydraulic pressure in the cylinder of the brake caliper 43 in accordance with the hydraulic pressure control signal acquired from the brake ECU 41. In the manner described above, the braking force of the wheels (brake discs) by the brake caliper 43 is controlled.

(Operation)

The vehicle speed limiting ECU 10 has a first vehicle speed limiting function and a second vehicle speed limiting function of controlling the drive device 30 and the braking device 40 such that the speed vs of the own vehicle does not exceed the first speed vs1 and a second speed vs2, respectively. Further, the vehicle speed limiting ECU 10 includes a first cancel function and a second cancel function of disabling the first vehicle speed limiting function and the second vehicle speed limiting function, respectively. In other words, the vehicle speed limiting ECU 10 functions as a first vehicle speed limiting unit which restricts a speed increase exceeding the first speed vs1. Moreover, the vehicle speed limiting ECU 10 functions as a second vehicle speed limiting unit which restricts a speed increase exceeding the second speed vs2. Further, the vehicle speed limiting ECU 10 functions as a first cancel unit which cancels the speed limit imposed by the first vehicle speed limiting unit. Still further, the vehicle speed limiting ECU 10 functions as a second cancel unit which cancels the speed limit imposed by the second vehicle speed limiting unit.

(First Vehicle Speed Limiting Unit)

The first vehicle speed limiting unit controls the drive device 30 and/or the braking device 40 such that the speed vs of the own vehicle does not exceed the first speed vs1 set by the driver through use of the switch 23. Specifically, the vehicle speed limiting ECU 10 predicts (calculates) the speed vs of the own vehicle after a predetermined time from the current time point based on the data acquired from the ring buffer of the RAM (change in the vehicle speed vs in a predetermined time immediately before the current time point). After that, when this prediction result exceeds the first speed vs1, the first vehicle speed limiting unit controls the drive device 30 and/or the braking device 40 to decelerate the own vehicle.

(Second Vehicle Speed Limiting Unit)

The second vehicle speed limiting unit controls the drive device 30 and/or the braking device 40 such that the speed vs of the own vehicle does not exceed the second speed vs2. In the at least one embodiment, while the first speed vs1 is a value set by the driver through use of the switch 23, the second speed vs2 is a defined value set in advance (value which cannot be changed by a general user). It is known that, in general, when an electric vehicle travels at a high speed, a progress of deterioration of a battery is accelerated in some cases compared with a case in which the vehicle travels at a low speed. In order to suppress this early deterioration of the battery, the second speed vs2 is defined, and the drive device and the like are controlled such that the vehicle speed vs of the own vehicle does not exceed the second speed vs2. In the following description, a situation in which the first speed vs1 is set to a speed lower than the second speed vs2 is assumed.

(First Cancel Unit)

The first cancel unit disables the first vehicle speed limiting function as described below.

Figure 2:
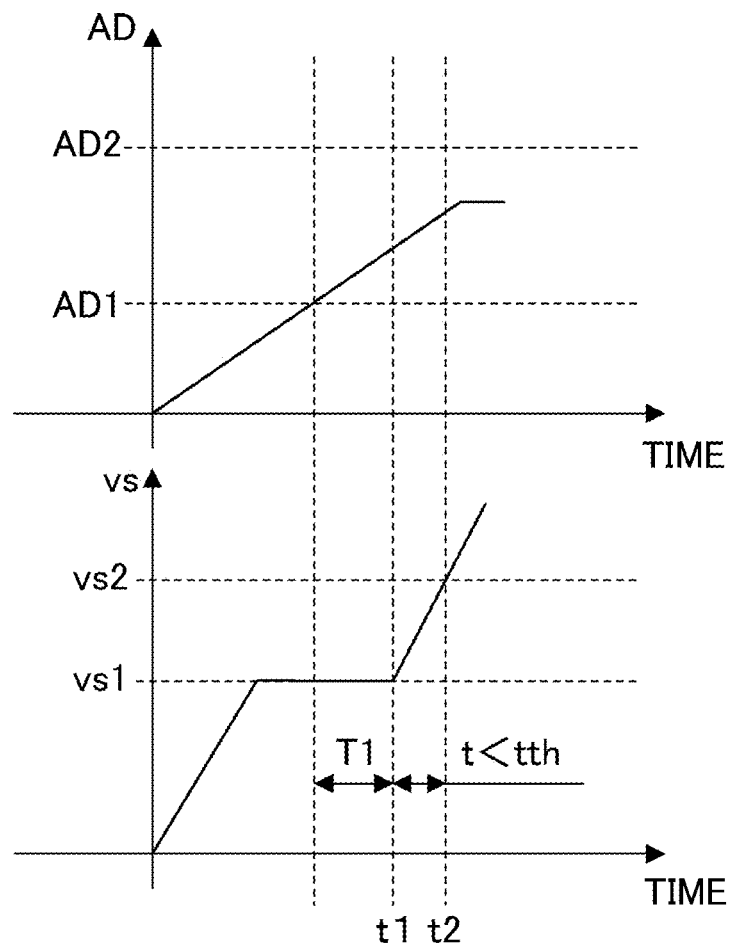
FIG. 2 is a graph for showing changes in a depression depth of an accelerator pedal and a speed of an own vehicle.
Figure 3:
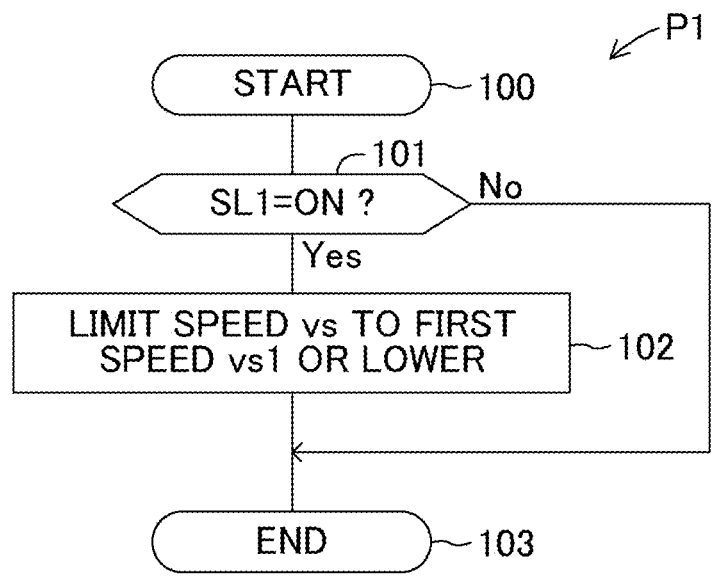
FIG. 3 is a flowchart of a program which implements a first vehicle speed limiting function.
Figure 4:
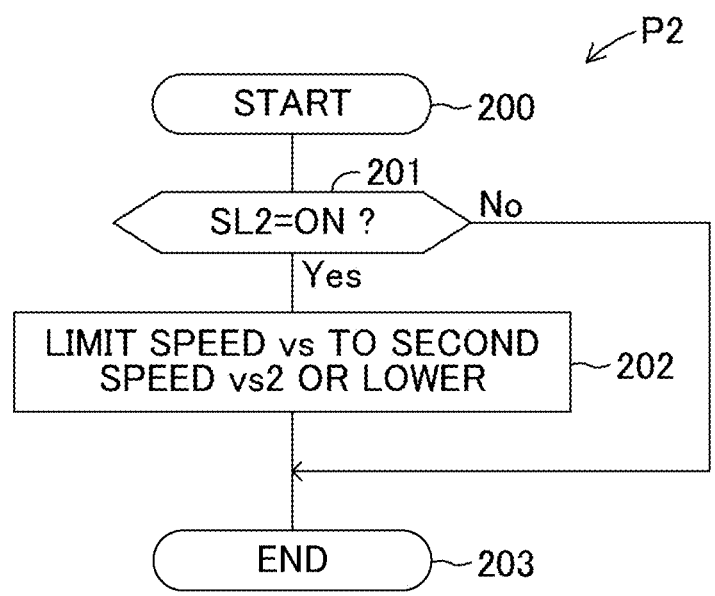
FIG. 4 is a flowchart of a program which implements a second vehicle speed limiting function.
Figure 5:
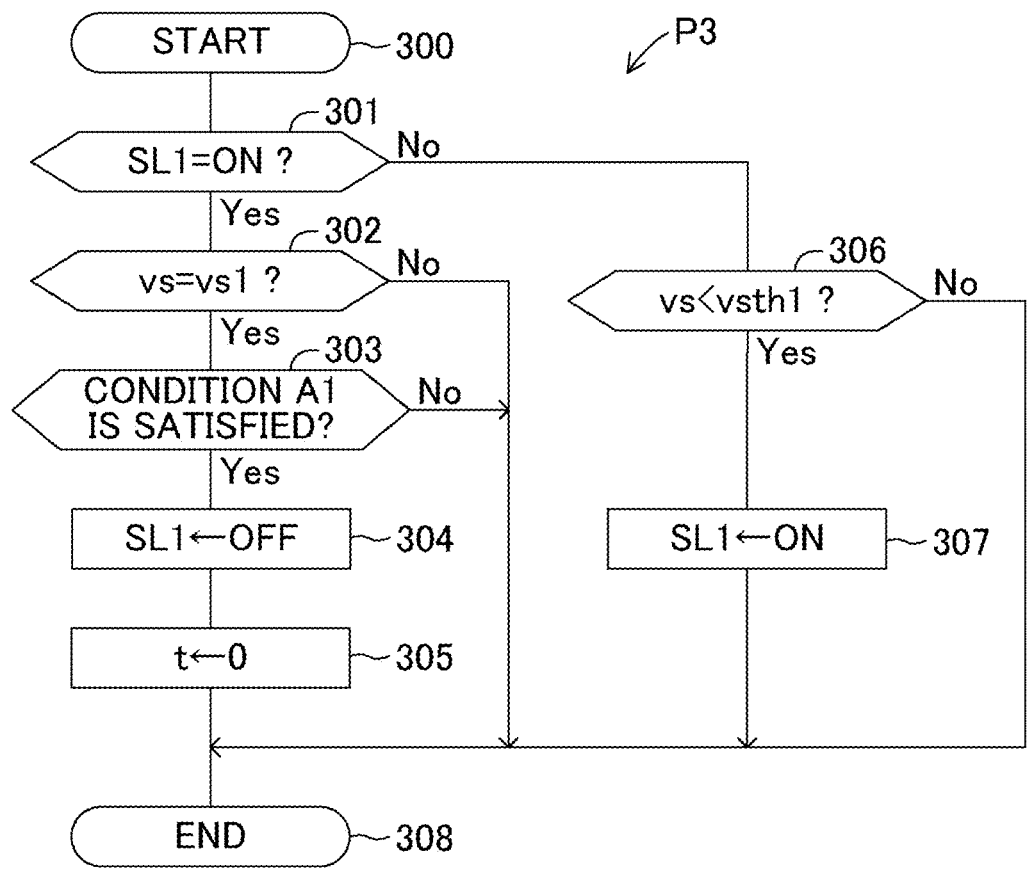
FIG. 5 is a flowchart of a program which implements a first cancel function.
Figure 6:
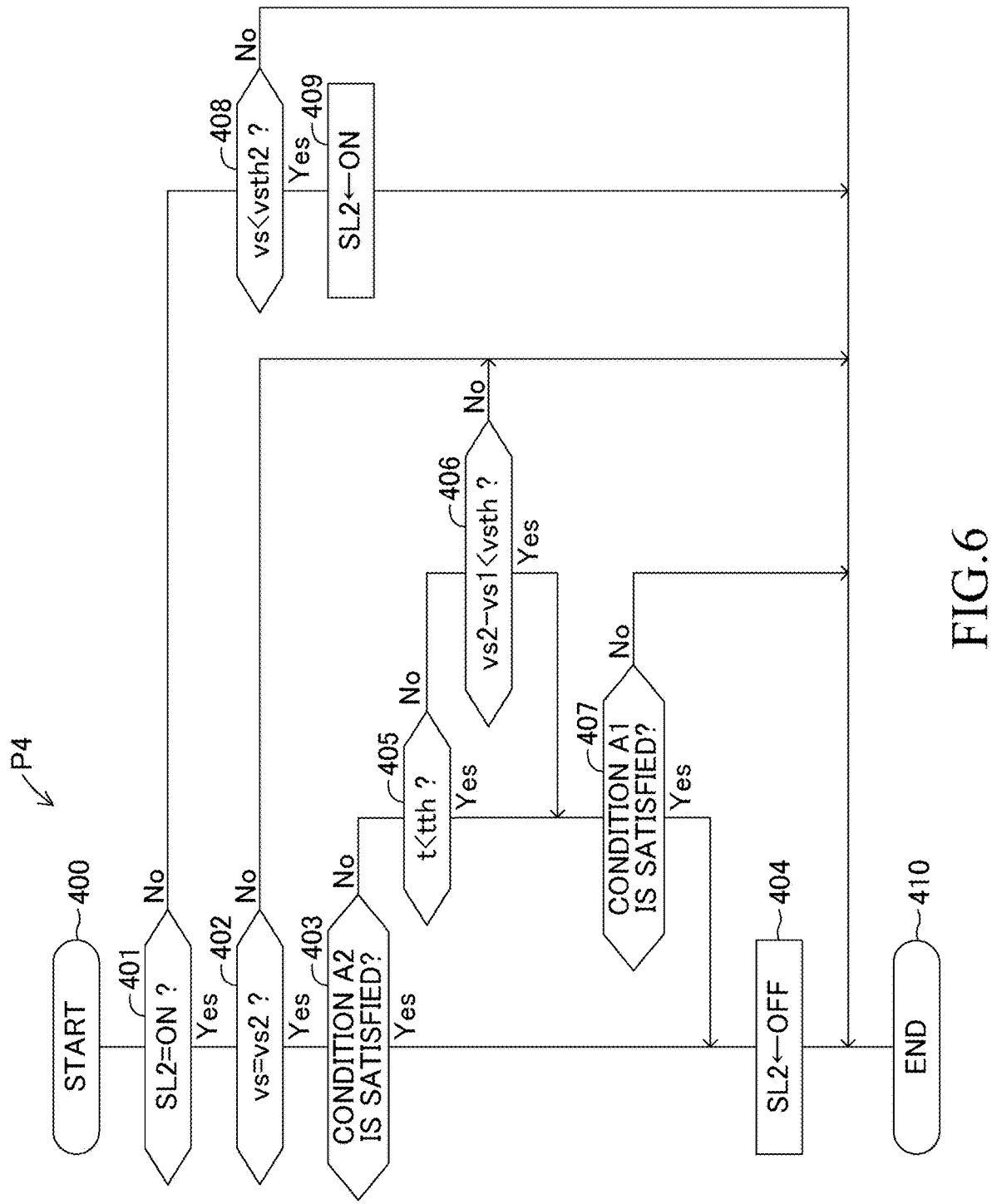
FIG. 6 is a flowchart of a program which implements a second cancel function.

In a situation in which the speed vs of the own vehicle has increased to reach the first speed vs1 and the increase in vehicle speed vs is restricted by the first vehicle speed limiting function (that is, in a situation in which the vehicle speed vs is equal to the first speed vs1), when a first accelerator pedal condition A1 described below is satisfied, the first cancel unit disables the first vehicle speed limiting function (see FIG. 2).

(A1) A duration of a state in which the depression depth AD of the accelerator pedal is deeper than a first depth AD1 is longer than a first time T1.

The first depth AD1 is set in advance to such a depth that the speed vs exceeds the first speed vs1 when the depression depth of the accelerator pedal is maintained at the first depth AD1. When the first vehicle speed limiting function is disabled as a result of the first accelerator pedal condition A1 being satisfied, the vehicle speed vs can be increased to be higher than the first speed vs1.

(Second Cancel Unit)

The second cancel unit disables the second vehicle speed limiting function as described below.

In a situation in which the speed vs of the own vehicle has increased to reach the second speed vs2 and the increase in vehicle speed vs of the own vehicle is restricted by the second vehicle speed limiting function (that is, in a situation in which the vehicle speed vs is equal to the second speed vs2), when a second accelerator pedal condition A2 described below is satisfied, the second cancel unit disables the second vehicle speed limiting function.

(A2) A duration of a state in which the depression depth AD of the accelerator pedal is deeper than a second depth AD2 (>AD1) is longer than a second time T2.

The second depth AD2 is set in advance to such a depth that the speed vs exceeds the second speed vs when the depression depth of the accelerator pedal is maintained at the second depth AD2. When the second vehicle speed limiting function is disabled as a result of the second accelerator pedal condition A2 being satisfied, the vehicle speed vs can be increased to be higher than the second speed vs2.

When the first vehicle speed limiting function and the second vehicle speed limiting function are to be disabled in scenes different from each other, there occurs no problem as long as the first vehicle speed limiting function and the second vehicle speed limiting function can independently be disabled when the first accelerator pedal condition and the second accelerator pedal condition are satisfied, respectively. Meanwhile, it is preferred that the first vehicle speed limiting function and the second vehicle speed limiting function be able to be quickly disabled in a situation (special situation) in which an avoidance operation such as avoiding an obstacle is required. Moreover, in the above-mentioned special situation, it is troublesome for the driver to satisfy each of the different conditions (first accelerator pedal condition and second accelerator pedal condition) in order to disable a corresponding one of the vehicle speed limiting functions (first vehicle speed limiting function and second vehicle speed limiting function), and there may occur a case in which a purpose (for example, the avoidance of an obstacle) in the special situation cannot be achieved. Further, it is required to wait for at least the second time T2 in order to satisfy the second accelerator pedal condition A2, and hence it takes time to disable the second vehicle speed limiting function.

In view of the above, in the at least one embodiment, the second cancel unit disables the second vehicle speed limiting function (forcible cancel function) even when the second accelerator pedal condition A2 is not satisfied when at least one of a condition X1 or a condition X2 described below is satisfied and a condition Y is satisfied at a time point t2 at which the speed vs reaches the second speed vs2.

(X1) A time "t" from a time point t1 at which the first vehicle speed limiting function is disabled to when the speed vs of the own vehicle reaches the second speed vs2 is shorter than a threshold value tth.

(X2) A difference between the first speed vs1 and the second speed vs2 is smaller than a threshold value vsth.

(Y) The first accelerator pedal condition A1 is continuously satisfied from the time point t1 to the time point t2.

With this forcible cancel function, when the above-mentioned condition X1 or condition X2 is satisfied and the condition Y is satisfied, the second vehicle speed limiting function is quickly disabled at the time point t2 (time point at which the speed vs reaches the second speed vs2).

The function of disabling the second vehicle speed limiting function in the situation in which the condition X1 and the condition Y are satisfied corresponds to a first forcible cancel function in the at least one embodiment of the present invention. Moreover, the function of disabling the second vehicle speed limiting function in the situation in which the condition X2 and the condition Y are satisfied corresponds to a second forcible cancel function in the at least one embodiment of the present invention.

Moreover, the first cancel unit enables the first vehicle speed limiting function when the vehicle speed vs decreases to a vehicle speed lower than a threshold value vsth1 lower than the first speed vs1 after the first cancel unit disables the first vehicle speed limiting function. Further, the second cancel unit enables the second vehicle speed limiting function when the vehicle speed vs decreases to a vehicle speed lower than a threshold value vsth2 lower than the second speed vs2 after the second cancel unit disables the second vehicle speed limiting function.

With reference to FIG. 3 to FIG. 6, description is now given of the above-mentioned operation (programs P1, P2, P3, and P4 for implementing the first vehicle speed limiting function, the second vehicle speed limiting function, the first cancel function, and the second cancel function, respectively) of the vehicle speed limiting ECU 10 (hereinafter simply referred to as "CPU"). When an ignition switch of the own vehicle is in an ON state, the CPU executes the program P1 to the program P4 at a predetermined cycle. A flag SL1 and a flag SL2 are used in the program P1 to the program P4. When the first vehicle speed limiting function is enabled, the flag SL1 is "ON." When the first vehicle speed limiting function is disabled, the flag SL1 is "OFF." When the second vehicle speed limiting function is enabled, the flag SL2 is "ON." When the second vehicle speed limiting function is disabled, the flag SL2 is "OFF." At a time point when the ignition switch of the own vehicle transitions to the ON state, the flag SL1 and the SL2 are initialized to "ON."

(Program P1)

The CPU starts executing the program P1 from Step 100, and then advances the process to Step 101.

In Step 101, the CPU determines whether or not the flag SL1 is "ON." When the flag SL1 is "ON" ("Yes" in Step 101), the CPU advances the process to Step 102. Meanwhile, when the flag SL1 is "OFF" ("No" in Step 101), the CPU advances the process to Step 103, and ends execution of the program P1.

In Step 102, the CPU controls the drive device 30 and the braking device 40 such that the state in which the speed vs is equal to or lower than the first speed vs1 is maintained. After that, the CPU advances the process to Step 103.

(Program P2)

The CPU starts executing the program P2 from Step 200, and then advances the process to Step 201.

In Step 201, the CPU determines whether or not the flag SL2 is "ON." When the flag SL2 is "ON" ("Yes" in Step 201), the CPU advances the process to Step 202. Meanwhile, when the flag SL2 is "OFF" ("No" in Step 201), the CPU advances the process to Step 203, and ends execution of the program P2.

In Step 202, the CPU controls the drive device 30 and the braking device 40 such that the state in which the speed vs is equal to or lower than the second speed vs2 is maintained. After that, the CPU advances the process to Step 203.

(Program P3)

The CPU starts executing the program P3 from Step 300, and then advances the process to Step 301.

In Step 301, the CPU determines whether or not the flag SL1 is "ON." When the flag SL1 is "ON" ("Yes" in Step 301), the CPU advances the process to Step 302. Meanwhile, when the flag SL1 is "OFF" ("No" in Step 301), the CPU advances the process to Step 306.

In Step 302, the CPU determines whether or not the speed vs matches the first speed vs1. That is, the CPU determines whether or not there exists a situation in which the vehicle speed vs has increased to reach the first speed vs1 and a further increase in speed vs is limited by the first vehicle speed limiting function. When the speed vs matches the first speed vs1 ("Yes" in Step 302), the CPU advances the process to Step 303. Meanwhile, when the speed vs is lower than the first speed vs1 ("No" in Step 302), the CPU advances the process to Step 308, and ends execution of the program P3.

In Step 303, the CPU determines whether or not the condition A1 is satisfied. When the condition A1 is satisfied ("Yes" in Step 303), the CPU advances the process to Step 304. Meanwhile, when the condition A1 is not satisfied ("No" in Step 303), the CPU advances the process to Step 308.

In Step 304, the CPU sets the flag SL1 to "OFF." That is, the CPU disables the first vehicle speed limiting function. After that, the CPU advances the process to Step 305.

In Step 305, the CPU initializes the measurement time "t" (output value) of the timer to "0," and causes the timer to start time measurement (measurement of the elapsed time from the time point at which the first vehicle speed limiting function is disabled). After that, the CPU advances the process to Step 308.

Moreover, when the process is advanced from Step 301 to Step 306, the CPU determines whether or not the speed vs is lower than the threshold value vsth1 lower than the first speed vs1. When the speed vs is lower than the threshold value vsth1 ("Yes" in Step 306), the CPU advances the process to Step 307. Meanwhile, when the speed vs is equal to or higher than the threshold value vsth1 ("No" in Step 306), the CPU advances the process to Step 308.

In Step 307, the CPU sets the flag SL1 to "ON." After that, the CPU advances the process to Step 308.

(Program P4)

The CPU starts executing the program P4 from Step 400, and then advances the process to Step 401.

In Step 401, the CPU determines whether or not the flag SL2 is "ON." When the flag SL2 is "ON" ("Yes" in Step 401), the CPU advances the process to Step 402. Meanwhile, when the flag SL2 is "OFF" ("No" in Step 401), the CPU advances the process to Step 408.

In Step 402, the CPU determines whether or not the speed vs matches the second speed vs2. That is, the CPU determines whether or not there exists a situation in which the vehicle speed vs has increased to reach the second speed vs2 and a further increase in speed vs is limited by the second vehicle speed limiting function. When the speed vs matches the second speed vs2 ("Yes" in Step 402), the CPU advances the process to Step 403. Meanwhile, when the speed vs is lower than the second speed vs2 ("No" in Step 402), the CPU advances the process to Step 410, and ends execution of the program P4.

In Step 403, the CPU determines whether or not the condition A2 is satisfied. When the condition A2 is satisfied ("Yes" in Step 403), the CPU advances the process to Step 404. Meanwhile, when the condition A2 is not satisfied ("No" in Step 403), the CPU advances the process to Step 405.

In Step 404, the CPU sets the flag SL2 to "OFF." That is, the CPU disables the second vehicle speed limiting function. After that, the CPU advances the process to Step 410.

Moreover, when the process is advanced from Step 403 to Step 405, the CPU determines whether or not the measurement time "t" of the timer (elapsed time since the time point t1 at which the first vehicle speed limiting function is disabled) is shorter than the threshold value tth. When the measurement time "t" is shorter than the threshold value tth ("Yes" in Step 405), the CPU advances the process to Step 407. Meanwhile, when the measurement time "t" is equal to or longer than the threshold value tth ("No" in Step 405), the CPU advances the process to Step 406.

In Step 406, the CPU determines whether or not the difference between the second speed vs2 and the first speed vs1 is smaller than the threshold value vsth. When the difference between the second speed vs2 and the first speed vs1 is smaller than the threshold value vsth ("Yes" in Step 406), the CPU advances the process to Step 407. Meanwhile, when the difference between the second speed vs2 and the first speed vs1 is equal to or larger than the threshold value vsth ("No" in Step 406), the CPU advances the process to Step 410.

In Step 407, the CPU determines whether or not the condition A1 has continuously been satisfied since the time point t1 at which the first vehicle speed limiting function was disabled based on the depression depth AD stored in the RAM (ring buffer). When the condition A1 has continuously been satisfied since the time point t1 ("Yes" in Step 407), the CPU advances the process to Step 404. Meanwhile, when there is a time period in which the condition A1 is not satisfied after the first vehicle speed limiting function was disabled ("No" in Step 407), the CPU advances the process to Step 410.

Moreover, when the process is advanced from Step 401 to Step 408, the CPU determines whether or not the speed vs is lower than the threshold value vsth2 lower than the second speed vs2. When the speed vs is lower than the threshold value vsth2 ("Yes" in Step 408), the CPU advances the process to Step 409. Meanwhile, when the speed vs is equal to or higher than the threshold value vsth2 ("No" in Step 408), the CPU advances the process to Step 410.

In Step 409, the CPU sets the flag SL2 to "ON," and then advances the process to Step 410.

Effects

The situation in which the vehicle is accelerated such that the vehicle speed vs reaches from the first speed vs1 to the second speed vs2 in a relatively short time (<threshold value tth) after the first vehicle speed limiting function is disabled is considered as the situation in which a degree of emergency is high (special situation in which it is required to quickly accelerate the own vehicle). In the at least one embodiment, even when the condition A2 is not satisfied in a situation in which the measurement time "t" is shorter than the threshold value tth and the condition A1 is satisfied at the second time point t2, the second vehicle speed limiting function is disabled through the first forcible cancel function. Moreover, in the special situation in which the difference between the first speed vs1 and the second speed vs2 is relatively small, necessity for providing the two vehicle speed limiting functions (first vehicle speed limiting function and second vehicle speed limiting function) is low. Thus, in the at least one embodiment, when the condition A1 is continuously satisfied from the first time point t1 to the second time point t2 in the case in which the difference between the first speed vs1 and the second speed vs2 is smaller than the threshold value vsth, the second vehicle speed limiting function is disabled through the second forcible cancel function. That is, in the above-mentioned special situation, it is not required for the driver to maintain the state in which the accelerator pedal is depressed to a depth deeper than the first depth AD1 to disable the first vehicle speed limiting function, and to then maintain the state in which the accelerator pedal is depressed to a depth deeper than the second depth AD2 deeper than the first depth AD1 in order to disable the second vehicle speed limiting function. As described above, according to the at least one embodiment, in the special situation, the driver can disable the second vehicle speed limiting function more easily than in the usual situation.

The present invention is not limited to the at least one embodiment described above, and various modification examples can be adopted within the scope of the present invention as described below.

Modification Example 1

In the at least one embodiment described above, the second speed vs2 is defined in advance, but the driver may be able to set (change) the second speed vs2. Moreover, the second speed vs2 is not limited to the speed limiting value for suppressing the deterioration of the battery, but may be a speed limiting value for achieving another purpose.

Modification Example 2

In the at least one embodiment, there is provided a configuration in which the condition Y is satisfied when "the first accelerator pedal condition A1 is continuously satisfied in the time period from the time point t1 to the time point t2." In place of this configuration, there may be provided a configuration in which the condition Y is satisfied when "the first accelerator pedal condition A1 is satisfied at the time point t2." That is, in this case, even when there is a time period in which the depression depth AD is smaller than the first depth AD1 from the time point t1 to the time point t2, when the first accelerator pedal condition A1 is finally satisfied at the time point t2, the condition Y is satisfied.

Modification Example 3

The vehicle speed limiting ECU 10 may have only one of the first forcible cancel function and the second forcible cancel function.

Modification Example 4

Any one or both of the first accelerator pedal condition A1 or the second accelerator pedal condition A2 may be changed as described below.
(A1) An increase rate (%/sec) of the depression depth AD of the accelerator pedal exceeds a first increase rate.
(A2) An increase rate (%/sec) of the depression depth AD of the accelerator pedal exceeds a second increase rate.
The vehicle V may be an autonomous vehicle.

What is claimed is:

1. A vehicle speed limiting device, comprising:
an operation unit sensor configured to detect an operation mode of an operation unit to be operated when a driver accelerates an own vehicle;
a speed sensor configured to detect a speed of the own vehicle; and
a control device having a first vehicle speed limiting function of controlling any one or both of a drive device and a braking device of the own vehicle such that the speed does not exceed a first speed, a first cancel function of disabling the first vehicle speed limiting function when a first operation unit condition relating to an operation on the operation unit is satisfied in a situation in which the speed of the own vehicle matches the first speed, a second vehicle speed limiting function of controlling any one or both of the drive device and the braking device of the own vehicle such that the speed of the own vehicle does not exceed a second speed higher than the first speed, and a second cancel function of disabling the second vehicle speed limiting function when a second operation unit condition relating to the operation on the operation unit is satisfied in a situation in which the speed of the own vehicle matches the second speed,
wherein the control device has at least one of:
a first forcible cancel function of forcibly disabling the second vehicle speed limiting function when an elapsed time from a first time point at which the first vehicle speed limiting function is disabled through use of the first cancel function to a second time point at which the speed of the own vehicle reaches the second speed is shorter than a predetermined threshold value and the first operation unit condition is satisfied at the second time point; or
a second forcible cancel function of forcibly disabling the second vehicle speed limiting function when a difference between the first speed and the second speed is smaller than a predetermined threshold value and the first operation unit condition is satisfied at the second time point after the first vehicle speed limiting function is disabled through use of the first cancel function.

2. The vehicle speed limiting device according to claim 1, wherein the first forcible cancel function is a function of forcibly disabling the second vehicle speed limiting function when the elapsed time from the first time point to the second time point is shorter than the predetermined threshold value and the first operation unit condition is continuously satisfied from the first time point to the second time point.

3. The vehicle speed limiting device according to claim 2, wherein the second forcible cancel function is a function of forcibly disabling the second vehicle speed limiting function when the difference between the first speed and the second speed is smaller than the predetermined threshold value and the first operation unit condition is continuously satisfied from the first time point to the second time point.

4. The vehicle speed limiting device according to claim 1, wherein the second forcible cancel function is a function of forcibly disabling the second vehicle speed limiting function when the difference between the first speed and the second speed is smaller than the predetermined threshold value and the first operation unit condition is continuously satisfied from the first time point to the second time point.

5. A vehicle speed limiting method, comprising:
a step of detecting an operation mode of an operation unit to be operated when a driver accelerates an own vehicle;
a step of detecting a speed of the own vehicle; and
a control step of achieving a first vehicle speed limiting function of controlling any one or both of a drive device and a braking device of the own vehicle such that the speed does not exceed a first speed, a first cancel function of disabling the first vehicle speed limiting function when a first operation unit condition relating to an operation on the operation unit is satisfied in a situation in which the speed of the own vehicle matches the first speed, a second vehicle speed limiting function of controlling any one or both of the drive device and the braking device of the own vehicle such that the speed of the own vehicle does not exceed a second speed higher than the first speed, and a second cancel function of disabling the second vehicle speed limiting function when a second operation unit condition relating to the operation on the operation unit is satisfied in a situation in which the speed of the own vehicle matches the second speed, wherein the control step includes a step of achieving at least one of:
- a first forcible cancel function of forcibly disabling the second vehicle speed limiting function when an elapsed time from a first time point at which the first vehicle speed limiting function is disabled through use of the first cancel function to a second time point at which the speed of the own vehicle reaches the second speed is shorter than a predetermined threshold value and the first operation unit condition is satisfied at the second time point; or
- a second forcible cancel function of forcibly disabling the second vehicle speed limiting function when a difference between the first speed and the second speed is smaller than a predetermined threshold value and the first operation unit condition is satisfied at the second time point after the first vehicle speed limiting function is disabled through use of the first cancel function.

6. A non-transitory storage medium storing a vehicle speed limiting program for causing a computer of an own vehicle to execute:
- a step of detecting an operation mode of an operation unit to be operated when a driver accelerates the own vehicle;
- a step of detecting a speed of the own vehicle; and
- a control step of achieving a first vehicle speed limiting function of controlling any one or both of a drive device and a braking device of the own vehicle such that the speed does not exceed a first speed, a first cancel function of disabling the first vehicle speed limiting function when a first operation unit condition relating to an operation on the operation unit is satisfied in a situation in which the speed of the own vehicle matches the first speed, a second vehicle speed limiting function of controlling any one or both of the drive device and the braking device of the own vehicle such that the speed of the own vehicle does not exceed a second speed higher than the first speed, and a second cancel function of disabling the second vehicle speed limiting function when a second operation unit condition relating to the operation on the operation unit is satisfied in a situation in which the speed of the own vehicle matches the second speed, wherein the control step includes a step of achieving at least one of:
- a first forcible cancel function of forcibly disabling the second vehicle speed limiting function when an elapsed time from a first time point at which the first vehicle speed limiting function is disabled through use of the first cancel function to a second time point at which the speed of the own vehicle reaches the second speed is shorter than a predetermined threshold value and the first operation unit condition is satisfied at the second time point; or
- a second forcible cancel function of forcibly disabling the second vehicle speed limiting function when a difference between the first speed and the second speed is smaller than a predetermined threshold value and the first operation unit condition is satisfied at the second time point after the first vehicle speed limiting function is disabled through use of the first cancel function.

* * * * *